July 17, 1923.
C. N. McCLINTOCK
1,462,117
TIRE AND RIM CONSTRUCTION
Filed March 3, 1922
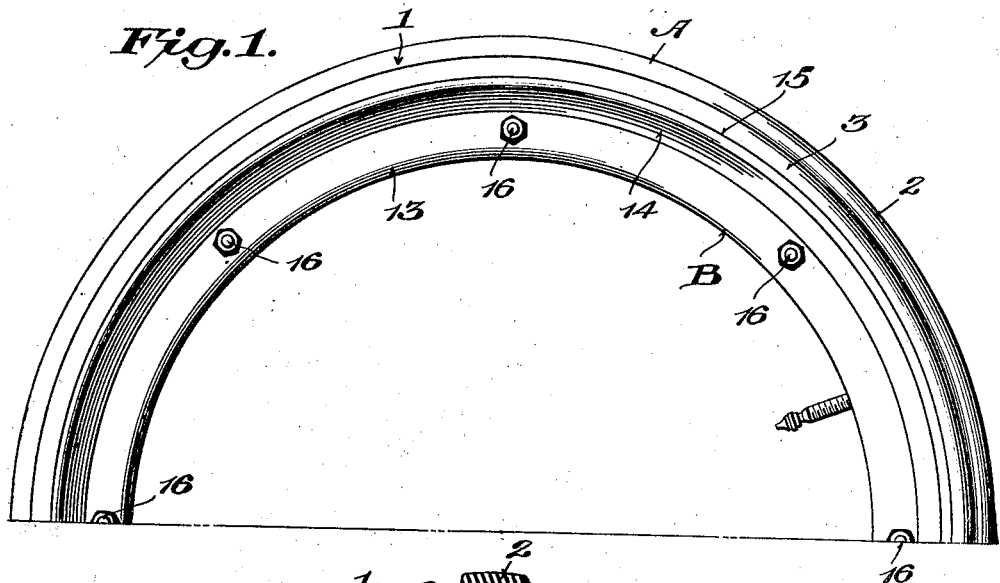
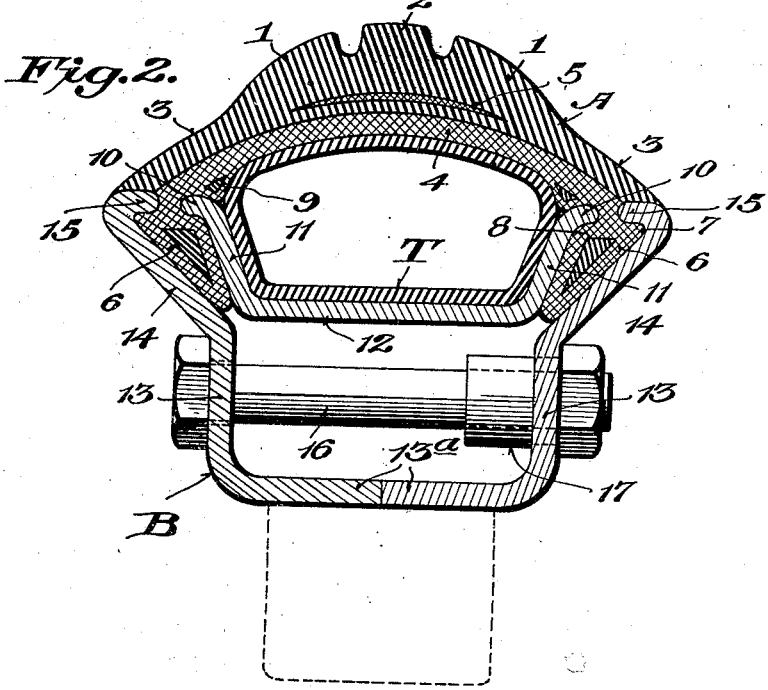
Witnesses:—
Chas. L. Griestauer
Emory L. Groff
Inventor
Charles N. McClintock,
By
Attorney Patented July 17, 1923.

1,462,117

UNITED STATES PATENT OFFICE.

CHARLES N. McCLINTOCK, OF ELWOOD, INDIANA.

TIRE AND RIM CONSTRUCTION.

Application filed March 3, 1922. Serial No. 540,777.

*To all whom it may concern:*

Be it known that I, CHARLES N. McCLINTOCK, citizen of the United States, residing at Elwood, in the county of Madison and State of Indiana, have invented certain new and useful Improvement in Tire and Rim Constructions, of which the following is a specification.

This invention relates to a novel combined tire and rim construction for vehicle wheels.

One of the objects of the invention is to provide a novel shoe and cooperating rim parts adapted to effectually house and protect a pneumatic inner tube, and also hold or clamp the shoe tightly so as to prevent relative movement between the rubber or fabric parts and the metal thereby reducing wear and cutting to a minimum.

Another object is to provide a simple practical and reliable construction that may be easily and readily assembled.

A further object of the invention is to provide a shoe having no side walls and the arc of its cross section having a relatively great radius thereby obtaining the advantages of a wide tire on a narrow rim.

With the above and other objects in view while will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 1 is a side elevation of a portion of the combined tire and rim construction.

Figure 2 is a cross sectional view thereof.

Similar reference characters designate corresponding parts throughout the several figures of the drawings.

In carrying the invention into effect it is proposed to provide a resilient shoe A and a novel rim B for holding the shoe and securing it to the wheel felly by any suitable and convenient type of holding lug well-known in the art. Therefore, it will be apparent that the present invention aims to provide a combined tire and rim construction that may be handled as a unit to be placed on and removed from the usual wheel felly in the well-known manner.

Referring to the shoe A, it will be observed that the same essentially comprises a tread portion 1 of relatively flat arched cross section, i. e., formed on an arc having a relatively long radius and having the reinforced traction portion 2 at the crown thereof, while the side edges 3 overlie the edges of the rim B. As shown in the drawings, this shoe is preferably formed with a fabric base 4, and the reinforced traction portion 2 of the tread may have embedded therein a breaker strip 5.

The opposite edge portions of the fabric body of the tread are formed with the holding beads 6 that may be of the substantially triangular cross section shown, thereby providing the inner and outer shoulders 7 and 8 for engaging with the rim parts. Also the inside face of the shoe may be provided adjacent the shoulders 8 with the guard ribs 9 for cooperating with the said shoulders to receive the keeper edges 10 of the inclined flanges 11 of a relatively floating interior locking ring 12 and serve not only to prevent cutting of the shoe by the edges of the ring, but also prevent the inner tube T from being pinched between the keeper edges 10 and the inside of the shoe or casing when the tire is in use.

The rim B preferably consists of the relatively separable sections 13 having the upwardly inclined bead seating flanges 14 and the clincher edges 15; and, for the purpose of holding the sections 13 in assembled relation, bolts 16 may be used. The said bolts extend through the vertical wall portions of the rim sections thereby to clamp said sections together, and for preventing the sections being rocked inwardly at their upper ends with the lower meeting edges 13ª as a fulcrum, the shank of the bolt may be provided with an abutment or ferrule 17.

From the foregoing it will be apparent that one of the novel and distinctive features of the invention is a combined tire and rim construction consisting of a resilient shoe having clincher beads adapted to be clamped between the flanges 11 of the floating locking ring 12 and the flanges 14 of the relatively separable rim sections 13. When the pneumatic tube T is inflated, all parts of the rim and shoe are locked together and the desired resiliency is imparted to the casing or shoe. At the same time additional resiliency is afforded by the extra wide tread due to the relatively low or flat arched cross sectional formation previously referred to. That is to say, due to the relatively long radius upon which the cross section of the shoe is formed, for example six inches, while the width of the rim, between the clincher flanges is only three and one-half inches, a tire is provided having a relatively wide traction face, and no side walls thereby forming a rubber and fabric tire using a minimum amount of material yet having the advantages of a tire of relatively great width on a small rim. In referring to an arc of relatively long radius it is pointed out that the center of the radius is located at a point beyond the rim toward the axis on which the rim rotates or rolls.

Without further description it is thought that the features and advantages of the present improvement will be readily apparent to those skilled in the art and it will of course be understood that changes in the form, proportion and minor details of construction may be resorted to without departing from the spirit of the invention or scope of the appended claims.

I claim:—

1. A combined tire and rim construction for vehicle wheels including a casing having clincher beads formed at opposite edges thereof and providing inner and outer shoulders, and also having wings formed at the edges of the tread for overlying the outer shoulders of the beads, an inner floating ring engaging with the inner shoulders of the beads, and a rim consisting of separable sections and each having inturned clincher flanges for engaging the outer shoulders of the beads and lying beneath the said wings.

2. A combined tire and rim construction for vehicle wheels including a casing having shouldered clincher beads provided with outer and inner shoulders, a main rim providing seats for the outer faces of the beads and interlocking with the outer shoulders thereof, and an interior ring engaging with the inner shoulders of the beads and having a portion for engaging the inner faces of the beads and clamping the same to the seats provided by the main rim.

3. A combined tire and rim construction including a main rim consisting of laterally separable sections having outwardly flaring inclined bead seats terminating in inturned holding flanges, a casing having beads provided with outer and inner shoulders, an interior ring having side flanges and outturned keeper edges for engaging with the inner shoulders of the beads, and a pneumatic tube contained within the casing and the inner ring.

In testimony whereof I hereunto affix my signature in the presence of two witnesses.

CHARLES N. McCLINTOCK.

Witnesses:
ELI P. MYERS,
GLADYS HEATER.